(12) United States Patent
Plewnia

(10) Patent No.: US 11,590,957 B2
(45) Date of Patent: Feb. 28, 2023

(54) METHOD FOR TESTING A BRAKE FLUID SENSOR

(71) Applicant: ZF Active Safety GmbH, Koblenz (DE)

(72) Inventor: Heinrich Plewnia, Niederhofen (DE)

(73) Assignee: ZF Active Safety GmbH, Koblenz (DE)

( * ) Notice: Subject to any disclaimer, the term of this patent is extended or adjusted under 35 U.S.C. 154(b) by 269 days.

(21) Appl. No.: 16/997,714

(22) Filed: Aug. 19, 2020

(65) Prior Publication Data

US 2021/0053546 A1 Feb. 25, 2021

(30) Foreign Application Priority Data

Aug. 19, 2019 (DE) .................... 102019122169.2

(51) Int. Cl.
| | | |
|---|---|---|
| *B60T 17/22* | (2006.01) | |
| *B60T 17/06* | (2006.01) | |
| *G01F 23/38* | (2006.01) | |
| *G01F 25/20* | (2022.01) | |
| *B60T 13/14* | (2006.01) | |
| *B60T 13/68* | (2006.01) | |

(52) U.S. Cl.
CPC ............ *B60T 17/221* (2013.01); *B60T 13/14* (2013.01); *B60T 13/686* (2013.01); *B60T 17/06* (2013.01); *B60T 17/225* (2013.01); *G01F 23/38* (2013.01); *G01F 25/20* (2022.01); *B60T 2270/406* (2013.01)

(58) Field of Classification Search
CPC ........ B60T 11/22; B60T 11/26; B60T 17/225; B60T 17/06; B60T 17/221; B60T 8/4275; B60T 8/48; B60T 8/4827; B60T 13/14; B60T 13/142; B60T 13/148
USPC ........................................................ 303/116.2
See application file for complete search history.

(56) References Cited

U.S. PATENT DOCUMENTS

| | | | | |
|---|---|---|---|---|
| 3,014,205 A | * | 12/1961 | Boehm | .................. G01F 25/22 340/625 |
| 3,560,918 A | * | 2/1971 | Lewis | .................. B60T 17/225 200/82 D |
| 3,831,429 A | * | 8/1974 | Kmiecik | ................. G01F 25/20 137/460 |
| 4,465,088 A | * | 8/1984 | Vosper | ................. F24H 9/2007 122/504 |
| 4,500,761 A | * | 2/1985 | Kubota | ................. B60T 17/225 116/109 |

(Continued)

FOREIGN PATENT DOCUMENTS

| | | | | |
|---|---|---|---|---|
| DE | 4014052 A1 | * | 7/1991 | ............ B60T 17/225 |
| DE | 4312063 C1 | | 6/1994 | |

(Continued)

*Primary Examiner* — Thomas J Williams
(74) *Attorney, Agent, or Firm* — Robert James Harwood

(57) ABSTRACT

The present disclosure relates to a method for testing a brake fluid sensor of a vehicle braking system, wherein the brake fluid sensor can indicate the fluid level in the fluid reservoir, wherein the method has the following steps: (1) Altering the fluid level in at least one region of the at least one fluid reservoir by means of at least one braking force generating device; and (2) Detecting whether the at least one brake fluid sensor emits a signal indicating the modified fluid level in the at least one region of the at least one fluid reservoir.

11 Claims, 1 Drawing Sheet

(56) References Cited

U.S. PATENT DOCUMENTS

| | | | | |
|---|---|---|---|---|
| 4,826,255 A | * | 5/1989 | Volz | B60T 8/445 |
| | | | | 188/358 |
| 5,197,788 A | * | 3/1993 | Fennel | B60T 8/4059 |
| | | | | 303/157 |
| 5,281,014 A | * | 1/1994 | Volz | B60T 8/445 |
| | | | | 303/10 |
| 5,609,401 A | * | 3/1997 | Johnston | B60T 8/4872 |
| | | | | 303/114.1 |
| 2021/0053546 A1 | * | 2/2021 | Plewnia | B60T 17/225 |
| 2021/0387608 A1 | * | 12/2021 | Haag | B60T 17/225 |

FOREIGN PATENT DOCUMENTS

| | | | | | |
|---|---|---|---|---|---|
| DE | 102016221435 A1 | * | 5/2018 | | G01F 23/38 |
| DE | 102018213752 A1 | | 2/2020 | | |
| EP | 249756 A | * | 12/1987 | | B60T 8/885 |
| GB | 1600703 A | * | 10/1981 | | B60G 17/0164 |
| GB | 2154799 A | * | 9/1985 | | B60T 17/225 |
| GB | 2159666 A | * | 12/1985 | | B60T 17/225 |

* cited by examiner

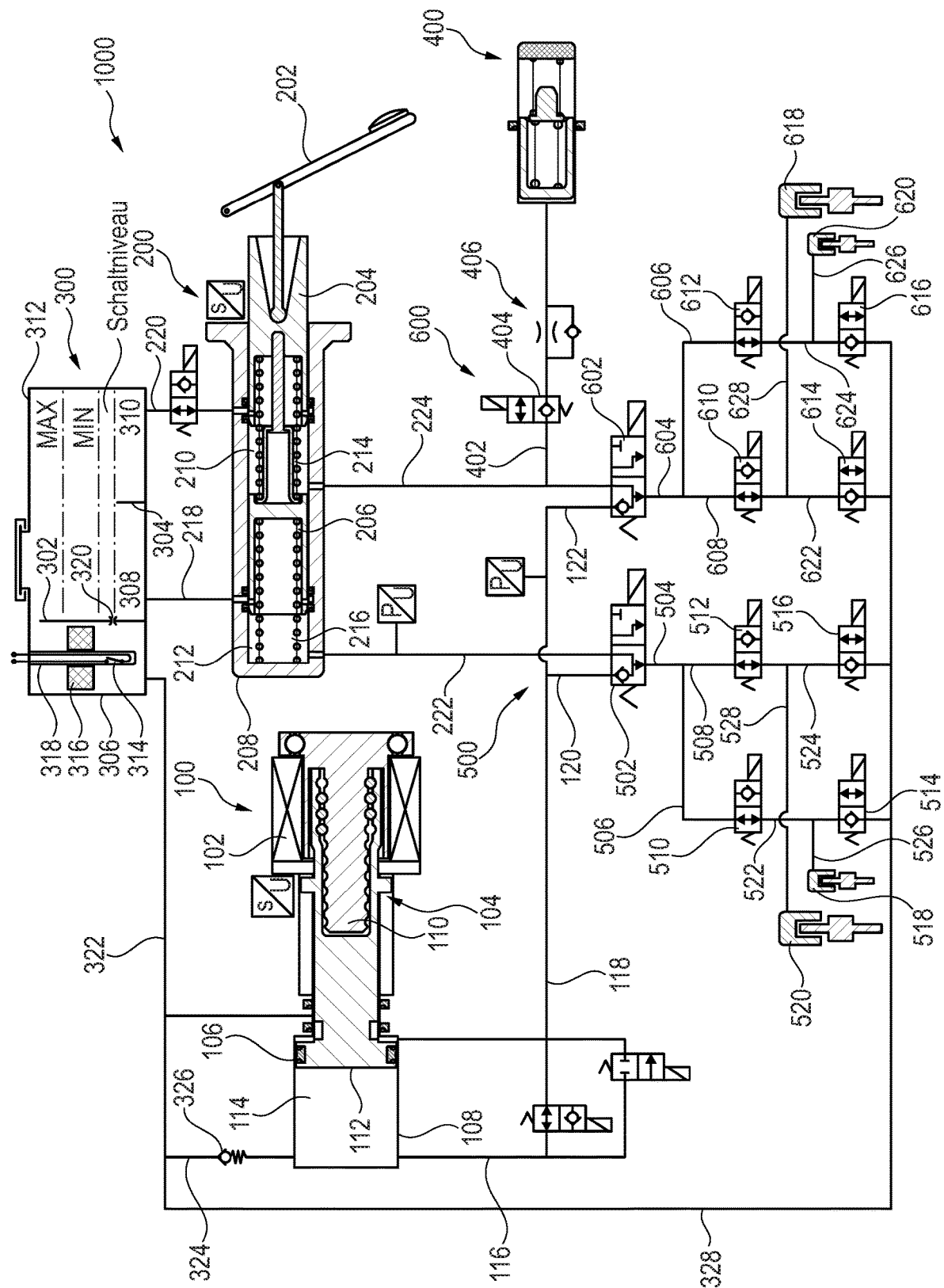

METHOD FOR TESTING A BRAKE FLUID SENSOR

CROSS-REFERENCE TO RELATED APPLICATION

This application claims priority to German Patent Application No. 102019122169.2 filed Aug. 19, 2019, the present disclosure of which is incorporated herein by reference in its entirety.

BACKGROUND

The present disclosure relates to a method for testing a brake fluid sensor for a vehicle braking system. The present disclosure moreover relates to a vehicle braking system which is suited for the performance of such a method. The present disclosure additionally relates to a fluid reservoir for such a vehicle braking system.

SUMMARY

The object of the present disclosure is to provide a cost-effective and easily implemented method for testing a brake fluid sensor. A further object of the present disclosure is moreover to provide a vehicle braking system which is suited for the performance of the method for testing a brake fluid sensor.

The method according to the present disclosure for testing a brake fluid sensor for a vehicle braking system comprises the following steps: (1). Altering the fluid level in at least one region of at least one fluid reservoir by means of at least one braking force generating device, and (2) Detecting whether the at least one brake fluid sensor emits a signal indicating the modified fluid level in the at least one region of the at least one fluid reservoir.

The method according to the present disclosure makes it possible to test quickly and simply whether the brake fluid sensor is functional or functions correctly. By means of the alteration in the fluid level in the fluid reservoir caused via the braking force generating device, it is possible to detect whether the brake fluid sensor accurately indicates the alteration in the fluid level. The functionality of the brake fluid sensor is very important in particular in the case of autonomous or semi-autonomous vehicles because in the case of autonomous vehicles the driver cannot react at all or only to a limited extent as a higher authority for monitoring the vehicle systems such as the brake system.

The braking force generating device can be an electromechanical braking force generating device. The braking force generating device can comprise at least one electromotor and at least one spindle arrangement. The at least one spindle arrangement can, for example, be a ball screw or a screw drive. The at least one braking force generating device moreover has at least one piston and at least one cylinder in which the piston is guided displaceably. The at least one electromotor can, via the at least one spindle arrangement, drive the at least one piston which defines a chamber for brake fluid in the cylinder. The brake fluid can be pressurized by the at least one braking force generating device in order to be able to apply a braking pressure to the wheel brakes of a vehicle braking system.

The step of altering the fluid level in the at least one region of the at least one fluid reservoir can comprise actuating the at least one braking force generating device in order to reduce the fluid level in the at least one region of the at least one fluid reservoir. The fluid level can, for example, be lowered to a fluid level at which the brake fluid sensor is to emit a signal in order to indicate a low brake fluid level. The braking force generating device can be connected to the at least one region of the fluid reservoir. The cylinder of the at least one braking force generating device or the chamber formed in the cylinder can be connected to the at least one region of the brake fluid reservoir via a line. The braking force generating device can thus draw brake fluid from the fluid reservoir and pump it into at least one braking circuit of the vehicle braking system. The fluid level in the at least one region of the at least one fluid reservoir can consequently be reduced.

The step of detecting the signal of the at least one brake fluid sensor can comprise detecting whether the at least one brake fluid sensor emits a signal indicating the reduced fluid level as a function of the reduction in the fluid level. The brake fluid sensor can, for example, emit a signal when the fluid level in the at least one region of the fluid reservoir falls below a predetermined fill level. This fill level be at or below a minimum fill level of the fluid reservoir.

The step of altering the fluid level in the at least one region of the at least one fluid reservoir can comprise conveying brake fluid from the at least one region of the fluid reservoir via the at least one braking force generating device and the at least one brake cylinder back to the fluid reservoir. The at least one fluid reservoir can have at least one first region and one second region. The brake fluid can be conveyed from the first region of the fluid reservoir back into the second region of the fluid reservoir via the at least one braking force generating device and the at least one brake cylinder. A connection between the at least one braking force generating device and the at least one brake cylinder can be produced via at least one valve arrangement.

The at least one valve arrangement can have at least one valve which can connect at least the brake cylinder and/or the at least one braking force generating device to at least one wheel brake. The at least one valve can assume a valve position, which permits a flow of brake fluid from the at least one braking force generating device to the at least one brake cylinder, in order to modify the fluid level in the at least one region of the at least one fluid reservoir. The at least one valve can, for example, be a three-way valve. The at least one valve can accordingly be a valve by means of the valve position of which the normal operation of the braking system or the so-called push-through operation of the braking system can be adjusted. In push-through operation, a fluid-conveying connection is produced between the brake cylinder and the wheel brakes of the vehicle braking system. Push-through operation can be used, for example, in the case where the electromechanical braking force generating device is not functional or functional only to a limited extent. The at least one valve can in particular be switched to push-through operation when the at least one valve is disconnected from the power supply. The at least one valve can be moved into its push-through valve position or can assume this valve position for the step of altering the fluid level in the at least one region of the at least one fluid reservoir.

The at least one valve arrangement can have at least one control valve which is associated with a wheel brake and can be part of an ABS or ESC (Electronic Stability Control) system. The braking pressure at the wheel brake can be controlled by means of the control valve. The control valve can control the supply of brake fluid to the wheel brake. A further control valve which controls the reduction in the braking pressure or discharge of the brake fluid can be associated with each wheel brake. The at least one control valve can be closed in order to alter the fluid level in the at least one region of the fluid reservoir. As a result, a flow of brake fluid from the braking force generating device to the brake cylinder can be permitted.

Owing to the described valve positions of the three-way valve and the control valve, the brake fluid can be pumped from the braking force generating device to the brake cylinder and hence flow back into the fluid reservoir. The at least one control valve can be arranged in the same braking circuit as the three-way valve.

A controlled or controllable level equalization can occur between the first region and the second region of the at least one fluid reservoir. At least one partition wall can be provided between the first region and the second region. At least one orifice which permits a level equalization between the first region and the second region can be provided at the at least one partition wall. The at least one orifice can be situated in the partition wall approximately at a position which corresponds to the fluid level at which the brake fluid sensor is to emit a signal regarding a low fluid level in the reservoir. If the fluid reservoir has, for example, a high fill level immediately after it has been filled, the braking force generating device can be activated such that the fluid level is reduced in the at least one region of the fluid reservoir when the brake fluid sensor is tested before the partition wall between the first and the second region can be overflowed.

The at least one brake fluid sensor can be arranged in or on the at least one fluid reservoir. The at least one brake fluid sensor can have at least one switch which can interact with at least one float. The at least one float can have at least one sensor element. The at least one sensor element can be a magnet. The at least one switch can be a reed switch. The reed switch can react to a magnetic field or be activated by a magnetic field. The reed switch can interrupt or close an electric circuit connected thereto on the basis of the change in its switching state. If the magnetic field generated by the sensor element approaches the brake fluid sensor or the switch, this switch can change its switching state and be transferred, for example, from the open switching state to a closed switching state. The change in the switching state of the respective switch can be detected by an electronic control unit. The electronic control unit can emit a signal on the basis of the detected change in switching state. The at least one sensor element can be displaced in a vertical direction relative to the sensor or switch. The at least one brake fluid sensor can be arranged in a sensor chamber inside the fluid reservoir. The sensor chamber can take a cylindrical or tubular form. The at least one sensor chamber can serve as a guide for the at least one float. For this purpose, the at least one sensor chamber can extend, for example, through an opening in the float.

The vehicle braking system according to the present disclosure can comprise a braking force generating device, at least one brake cylinder, at least one fluid reservoir for brake fluid, and at least one brake fluid sensor for the purpose of detecting the fluid level in the at least one fluid reservoir. The at least one fluid reservoir can have at least a first and a second region between which a partition wall is provided. The first region can be or is connected to the at least one braking force generating device. The second region can be or is connected to the brake cylinder. The brake fluid sensor detects the fluid level in the first region.

The at least one brake fluid sensor can be arranged in or on the first region of the fluid reservoir. The brake fluid sensor can have at least one switch and at least one sensor element. The at least one sensor element can be a magnet. The at least one sensor element can be arranged on a float. The at least one brake fluid sensor can be provided in a chamber which extends vertically into the fluid reservoir. The fluid reservoir can in particular be arranged in the first region of the fluid reservoir. The sensor element arranged on the float can be displaceable vertically relative to the sensor. The at least one chamber in which the brake fluid sensor is arranged can form a guide for the float with the sensor element.

At least one orifice can be provided in the at least one partition wall between the first region and the second region of the at least one fluid reservoir. The at least one orifice can be arranged vertically at a position in the partition wall which can correspond vertically to the arrangement position of the at least one brake fluid sensor. In other words, the at least one orifice can be provided vertically at a position in the partition wall which corresponds essentially to the fluid level at which the brake fluid sensor is to emit a signal or the signal emitted thereby is to change. The orifice can be formed by at least one opening and/or at least one slot in the partition wall.

The present disclosure moreover relates to a fluid reservoir for a vehicle braking system with at least a first region and a second region between which a partition wall is provided. At least one brake fluid sensor is provided in or on the first region of the fluid reservoir. The partition wall can have at least one orifice. At least one third region can be provided which is separated from the second region by means of at least one partition wall. The partition wall between the first and the second region can be vertically longer than the partition wall between the second and the third region.

BRIEF DESCRIPTION OF THE DRAWINGS

An exemplary embodiment is described below with reference to the attached drawing. FIG. 1 shows a schematic view of a vehicle braking system.

FIG. 1 shows a schematic view of a vehicle braking system 1000.

DETAILED DESCRIPTION

The vehicle braking system 1000 has an electromechanical braking force generating device 100, a brake cylinder 200, a fluid reservoir 300, a pedal force simulator 400, and two braking circuits 500 and 600. Such a vehicle braking system is also referred to as an IBC (Integrated Brake Control) system.

The electromechanical braking force generating device 100 comprises an electromotor 102, a spindle arrangement 104, a piston 106, and a cylinder 108. The spindle arrangement 104 drives the piston 106. The piston 106 is driven by means of the spindle 110 of the spindle arrangement 104. The piston 106 can be displaced in the cylinder 108. The piston 106 establishes, via its surface 112 remote from the spindle 110, a chamber 114 with a modifiable volume in the cylinder 108.

The brake cylinder 200 is coupled to a brake pedal 202 in a force-transmitting fashion. The brake cylinder 200 has two displaceable pistons 204 and 206 which define two pressure chambers 210 and 212 in the cylinder 208. Springs 214, 216 which can be compressed when the pistons 204, 206 are displaced are provided in the pressure chambers 210, 212. The two braking circuits 500 and 600 can be pressurized by means of the pressure chambers 210, 212. The pressure chambers 210, 212 are connected to the fluid reservoir 300 via lines 218, 220.

The fluid reservoir 300 has two partition walls 302 and 304 which divide the fluid reservoir 300 into three regions 306, 308, and 310. The partition wall 302 configures the first region 306 as a chamber in the fluid reservoir 300. The partition wall 302 has a predetermined extent vertically. The partition wall 302 does not extend completely between the base and the top part 312 of the reservoir 300 with the filling opening. The vertically upper end of the partition wall 302 has a gap from the top part 312 of the reservoir 300. Brake fluid can thus overflow the partition wall 302. The brake fluid sensor 314 is arranged in the first region or the first chamber 306 of the fluid reservoir 300. The sensor 314 interacts with a sensor element (not shown) attached to a float 316. The sensor 314 can be arranged in a sleeve or sensor chamber 318 accommodated in the first chamber 306. The sensor chamber 318 serves as a guide for the float 316. The float 316 has an opening via which the float is guided displaceably on the sensor chamber 318. For this purpose, the sensor chamber 318 can extend through the opening in the float 316.

The partition wall 302 has an orifice 320. Level equalization between the first chamber 306 and the other region 308, 310 of the fluid reservoir 300 is possible owing to the orifice 320. The partition wall 304 configures the regions 308 and 310 as further chambers in the fluid reservoir 300. However, the partition wall 304 is vertically shorter than the partition wall 302. The vertical extent of the partition wall 304 can be approximately ⅓ of the vertical extent of the partition wall 302. The orifice 320, which can be formed by an opening and/or at least one slot, is arranged vertically at an approximate height at which the partition wall 304 ends.

The brake fluid sensor 314 can be formed by a switch. The switch 314 can be a reed switch. The switch 314 can be arranged at approximately the same height as the orifice 320. The vertical position of the switch 314 and the orifice 320 corresponds substantially to the fill level of the fluid reservoir 300 at which the switch 300 is to emit a signal indicating a low fluid level or at which the signal emitted by it is to change in order to draw attention to the low fluid level.

The first chamber 306 is connected to the chamber 114 in the cylinder 108 of the braking force generating device 100 via lines 322 and 324. The chamber 114 of the braking force generating device 100 is connected to the valves 502 and 602 of the braking circuits 500, 600 via the lines 116, 118 and 120, 122. The valves 502, 602 are connected to the chambers 210, 212 of the brake cylinder 200 via the lines 222 and 224. The valves 502 and 602 can be three-way valves. The valves 502 and 602 are connected to control valves 510, 512, 514, 516 and 610, 612, 614, and 616 via lines 504, 506, 508 and 604, 606, and 608. The valves 510 and 514 are associated with a wheel brake 518. The valves 512 and 516 are associated with a wheel brake 520. The valves 610 and 614 are associated with a wheel brake 618 and the valves 612 and 616 with a wheel brake 620. Respective lines 522, 524 which are connected to the wheel brakes 518, 520 extend between the valves 510, 514 and the valves 512 and 516. In the same way, the lines 622 and 624 which are connected to the wheel brakes 618 and 620 extend between the valves 610, 614 and 612 and 616. The valves 514, 516, 614, and 616 are connected to the line 322 via the line 328. Brake fluid can be conveyed back to the fluid reservoir 300 via the line 328. The valves 510, 512, 514, 516, 610, 612, 614, 616 serve to control the brake pressure at the wheel brakes 518, 520, 618, 620.

The chamber 210 of the brake cylinder 200 can be connected to the pedal force simulator 400 via the line 224 and the line 402. A valve 404 and a throttle device 406 are provided in the line 402.

In normal operation of the vehicle braking system 1000, the valves 502, 602 assume a valve position which permits a flow of fluid between the chamber 114 of the braking force generating device 100 and the wheel brakes 518, 520, 618, 620. In this valve position, the braking force exerted by the driver on the brake pedal 202 and the hydraulic pressure which consequently occurs are transmitted from the chamber 210 of the brake cylinder 200 to the pedal force simulator 400 via the lines 224 and 402. The actual brake pressure is generated by the braking force generating device 100 which for this purpose draws brake fluid from the reservoir 300 and pumps it into the brake circuits 500 and 600. The brake cylinder 200 can thus be decoupled from the wheel brakes 518, 520, 618, 620 via the valves 501 and 602.

In order to be able to test the functioning of the brake fluid sensor 314, the valves 502 and 602 are brought into a valve position which permits a flow of fluid from the braking force generating device 100 to the valves 510, 512, 610, 614. At the same time, in this valve position of the valves 502 and 602, a flow of fluid to the brake cylinder 200 via the lines 222 and 224 is possible. The control valves 510, 512, 610, and 614 are closed. As a result, brake fluid can be drawn from the first chamber 306 of the reservoir 300 by means of the braking force generating device 100 and be pumped back to the brake cylinder 200 via the lines 116, 118, 120, 122, the valves 502 and 506 and the lines 222, 224 and hence into the chambers 308 and 314 of the reservoir 300 via the lines 218, 220. The fluid level in the first chamber 306 can in this way be reduced in order to be able to test the functioning of the brake fluid switch 314. The fluid level in the first chamber 306 is reduced to the fluid level marked in FIG. 1 as "switching level". At the switching level, the switch 314 should, as long as it is functional, emit a signal or the signal emitted by it should change in order to indicate a low fluid level in the chamber 306. If the sensor 314 emits a corresponding signal or the signal changes, the sensor 314 is functional and the method can be concluded.

In order to perform the method for testing the brake fluid sensor 314, the braking force generating device 100 is activated for a predetermined period. Even in the event of a high fluid level in the fluid reservoir, for example at the fluid level marked "MAX", the braking force generating device 100 can pump brake fluid from the first chamber 306 so quickly that the functioning of the sensor 314 can be tested without the brake fluid from the chambers 308, 310 being able to overflow the partition wall 305 and flow into the chamber 306. After the method has concluded and after the braking force generating device 100 has been deactivated, the fluid level between the chambers 308 and 310 and the chamber 306 can be equalized via the orifice 320 in the partition wall 302. The method is concluded by the activation of the braking force generating device 100 and the opening of the valves 510, 512, 610, and 612. The braking system 1000 is then restored to its normal state, i.e. brake-by-wire operation.

According to the exemplary embodiment described above with reference to FIG. 1, the method for testing the functioning of the brake fluid sensor 314 can comprise the following steps:

Reducing the fluid level in the first chamber 306 of the fluid reservoir 300, wherein the valves 502 and 602 are brought into their push-through valve position and the control valves 510, 512, 610, 612 are closed such that brake fluid from the first chamber 306 can be pumped by the braking force generating device 100 into the chambers 308 and 310 of the fluid reservoir 300, and Detecting whether the brake fluid sensor 314 emits a signal indicating the reduced fluid level in the first chamber 306 of the fluid reservoir 300.

The functionality of a brake fluid sensor can be tested quickly and easily by means of the method according to the present disclosure. The method can be performed, for example, when a vehicle is started and/or when the vehicle is parked and/or in specific operating/driving conditions of the vehicle, for example when the vehicle braking system is not activated or expected to be activated such as in the case of driving at a constant speed, and/or at specific, preferably cyclical operating points/points in time of the vehicle, for example when a specific mileage is reached.

What is claimed is:

1. A method for testing a brake fluid sensor for a vehicle braking system having wheel brakes, wherein the brake fluid sensor indicates the fluid level in at least one fluid reservoir, wherein the method includes the steps of:
    altering the fluid level in at least one region of the at least one fluid reservoir by means of at least one braking force generating device while the fluid reservoir is fluidly disconnected from all the wheel brakes; and
    detecting whether the at least one brake fluid sensor emits a signal indicating the modified fluid level in the at least one region of the at least one fluid reservoir.

2. The method as defined in claim 1, wherein the step of altering the fluid level in the at least one region of the at least one fluid reservoir further comprises the step of:
    activating the at least one braking force generating device in order to reduce the fluid level in the at least one region of the at least one fluid reservoir.

3. The method as defined in claim 2, wherein the step of detecting the signal of the at least one brake fluid sensor further comprises the step of:
    detecting whether the at least one brake fluid sensor emits a signal indicating the reduced fluid level as a function of the reduction in the fluid level.

4. The method as defined in claim 1, wherein the step of altering the fluid level in the at least one region of the at least one fluid reservoir further comprises the step of:
    conveying brake fluid from the at least one region of the fluid reservoir via the at least one braking force generating device and at least one brake cylinder back to the fluid reservoir.

5. The method as defined in claim 4, wherein the at least one fluid reservoir has at least one first region and at least one second region, and wherein the brake fluid is conveyed from the first region of the fluid reservoir into the second region of the fluid reservoir via the at least one braking force generating device and the at least one brake cylinder.

6. The method as defined in claim 4, further comprising at least one valve arrangement for producing a connection between the at least one braking force generating device and the at least one brake cylinder.

7. The method as defined in claim 6, wherein the at least one valve arrangement has at least one valve for connecting at least the brake cylinder and/or the at least one braking force generating device to at least one of the wheel brakes, and wherein the at least one valve can assume a valve position, which permits a flow of brake fluid from the at least one braking force generating device to the at least one brake cylinder, in order to modify the fluid level in at least one region of the at least one fluid reservoir.

8. The method as defined in claim 7, wherein the at least one valve arrangement has at least one control valve which is associated with at least one of the wheel brakes, and wherein the at least one control valve is closed in order to modify the fluid level in the at least one region of the fluid reservoir.

9. The method as defined in claim 5, wherein a controlled or controllable level equalization occurs between the first region and the second region of the at least one fluid reservoir.

10. The method as defined in claim 1, wherein the at least one brake fluid sensor is arranged in or on the at least one fluid reservoir.

11. The method as defined in claim 1, wherein the at least one brake fluid sensor has at least one switch for interacting with at least one float.

* * * * *